United States Patent [19]

Schneider

[11] Patent Number: 4,713,195
[45] Date of Patent: Dec. 15, 1987

[54] SCALE INHIBITOR

[75] Inventor: Burnett M. Schneider, Burlington, Wis.

[73] Assignee: Aqua-Chem Inc., Milwaukee, Wis.

[21] Appl. No.: 824,230

[22] Filed: Jan. 30, 1986

[51] Int. Cl.$^4$ ................................................. C02F 5/14
[52] U.S. Cl. ...................................... 252/180; 252/181
[58] Field of Search ................................. 252/180, 181

[56] References Cited

U.S. PATENT DOCUMENTS

| | | | |
|---|---|---|---|
| 3,451,939 | 6/1969 | Ralston | 252/181 |
| 3,481,869 | 12/1969 | Jones | 210/700 |
| 3,505,238 | 4/1970 | Liddell | 252/180 |
| 3,549,538 | 12/1970 | Jacklin | 252/82 |
| 3,663,448 | 5/1972 | Ralston | 252/180 |
| 3,682,224 | 8/1972 | Bleyle | 252/180 |
| 3,699,048 | 10/1972 | Krueger et al. | 252/180 |
| 3,751,372 | 8/1973 | Zecher | 252/181 |
| 4,001,134 | 1/1977 | Markofsky et al. | 252/180 |
| 4,147,627 | 4/1979 | Goodman | 252/180 |
| 4,166,041 | 8/1979 | Goodman | 252/180 |
| 4,255,259 | 3/1981 | Hwa et al. | 252/180 |
| 4,342,652 | 8/1982 | Schiller | 210/698 |
| 4,390,670 | 6/1983 | Walinsky | 210/701 |
| 4,446,045 | 5/1984 | Snyder et al. | 252/180 |
| 4,485,223 | 11/1984 | Walinsky | 526/317 |
| 4,545,920 | 10/1985 | Lorenc et al. | 252/180 |
| 4,547,559 | 10/1985 | Walinsky | 526/271 |
| 4,575,425 | 3/1986 | Boffardi et al. | 252/180 |

Primary Examiner—Robert Wax
Attorney, Agent, or Firm—John C. Cooper, III; Fred Wiviott

[57] ABSTRACT

A threshold scale inhibitor for aqueous solutions containing calcium and magnesium scale forming ions comprises a mixture of three components: a maleic acid or anhydride homopolymer, an organophosphonate and a sulfonated styrene-maleic acid copolymer. Synergism results from the use of such inhibitor. The inhibitor is useful for inhibiting scale formation with seawater distillation apparatus, reverse osmosis apparatus, electrodialysis apparatus, boilers, heat exchange systems, etc. and is employed in small amounts, such as 0.1 ppm to 200 ppm.

8 Claims, No Drawings

SCALE INHIBITOR

BACKGROUND OF THE INVENTION

1. Field of the Invention

The present invention relates generally to scale inhibitors used to prevent the formation of magnesium or calcium containing scale in water evaporation systems, boilers, water purification equipment and the like. More specifically, the present invention relates to a mixture of three scale inhibitors which produces an unexpected synergistic amount of scale prevention, when compared to the results obtained by using the single components or combinations of two of the three components.

2. Description of the Prior Art

Various types of salts which are soluble in natural waters, for example, salt water, will deposit as scale when the concentration of such salts exceeds the saturation value for the particular salt during processing, treatment or use of the water. Deposit of scale requires periodic cleaning of the equipment, leading to equipment downtime, the use of expensive cleaning chemicals, corrosion of the equipment, and the consequent labor cost associated with such cleaning. Such problems have been recognized for many years, and numerous researchers have attempted to develop systems for preventing or minimizing scale deposits, so that when cleaning is required the scale is easily removed once it has been formed. These attempts have been only partially successful since scaling is not completely prevented or minimized nor is the operating time between cleanings substantially extended.

The major scales which can form during the treatment of seawater include calcium carbonate, calcium sulfate and magnesium hydroxide, each presenting different formation prevention and cleaning problems. By way of example, if the treatment device is a spray film vapor compression evaporator operating on seawater, it typically will operate at concentration values of 2.0 or less, while calcium sulfate scale formation usually begins to occur when the concentration factor exceeds about 2.5. However, in badly fouled equipment, some calcium sulfate can deposit, so it cannot be ignored in considering scale inhibitor systems. On the other hand, because most seawater brine discharges in vapor compression distillation equipment have a pH exceeding 9.4, magnesium hydroxide is typically encountered in such equipment along with various forms of calcium, magnesium, carbonate and hydroxide compounds. Calcium carbonate will almost always form in vapor compression equipment along with the magnesium hydroxide and calcium sulfate. They often form complex compounds instead of the pure individual compounds.

It is also known that different scales have different cleaning characteristics, calcium carbonate being the easiest to remove because of its solubility in acid cleaning solutions. Magnesium hydroxide is much more slowly dissolved in acids, while calcium sulfate generally requires a chelating agent for removal.

Factors which affect the rate and amount of scale formation include the initial concentrations of the ionic species in the feed which combine to form the scale and the concentration factor of the brine, the pH of the solution being treated, temperature, ionic strength, the degree of supersaturation at various points in the treatment process, the effectiveness of the scale inhibitor used and the presense of nucleating sites in the water and/or on the surfaces of the equipment where scale crystals have already formed.

The pH of the system can be affected by the scale inhibitor, the initial concentration of the alkalinity and carbon dioxide concentration, the degree of carbon dioxide stripping in the treatment equipment, any thermal decomposition of alkalinity which may occur during treatment and by the ionic strength of the feed water and the ionic strength of the water as treatment proceeds.

The mere presence of scale forming compounds in a feed water does not necessarily mean scale will form, the condition precedent being that the concentration of the component has to exceed its respective saturation value. The point of saturation for each compound is known as the solubility product constant which varies for each, depending on the ionic strength and temperatures of the feed water. In working with scale inhibitor systems, it must also be kept in mind that when comparing the solubility product constant of various compounds, such as calcium carbonate and magnesium hydroxide, it is necessary to determine the actual concentration of the scale inducing ions in solution, even though they are almost never at a stoichiometric ratio. Accordingly, an ion product of the concentrations is used which is the product of the molar concentrations of the cationic and anionic species. When the root of the ion product is compared to the root of the solubility product constant, the degree of supersaturation can be determined. If the ion product is higher, the solution is supersaturated, and the higher it is, the greater the rate of scale formation. Scale inhibitors known prior to the present invention have not been able to prevent scale when the comparison yields a number which is in the range of 3–10 times the saturation factor.

Threshold scale inhibiting (TSI) compounds have been known for many years, and the term is used to describe compounds which can inhibit scale formation when the inhibitor is added in small quantities compared to the quantity of the scale forming salts. For example, certain carboxylic organic acids or salts can tie up calcium or magnesium ions in the feed water. Hydroxy acids, such as citric acid, weakly tie up the hardness ions, while chelating salts, e.g. EDTA, do a more effective job of tying up such ions. The major drawback of such scale inhibitors are that they act stoichiometrically, and therefore must be added in large quantities. The compounds then do not fit the classic definitions of being TSI.

To the knowledge of the present inventor, the first true TSI compounds were inorganic polyphosphates. As little as 10 to 25 ppm of such compounds can suppress the precipitation of from 100 to 300 ppm of calcium carbonate. Polyacrylic and polymaleic acids were also found to posess TSI properties, as were organic phosphonates such as HEDP (1-hydroxyethane-1, 1-diphosphonic acid) and various organic aminophosphonates. The latter presented somewhat of a mystery to researchers in the field, because they are not polymeric, but it is now believed that in waters containing scale forming ions, they do indeed form polymers with the hardness ions acting as links in the polymer formation process. If, however, the feed waters contain iron or other suspended solids, the organic phosphonates may be less effective, probably because of a blockage of the polymerization by the iron salts or the suspended solids.

To be effective as TSI compounds, several factors must be considered. They include the hydrophilic and hydrophobic character of the groups on the polymer and the length of the polymer, which will in term affect the solubility of the polymer in the feed water. Carboxyl, phosphoryl and sulfonic groups in the acid or sodium form add hydrophilic properties, while the same compounds in the calcium or magnesium salt form are hydrophobic. Solubility must also be considered, in that the chemical must be soluble in one form for addition to the treatment water and insoluble in another form after it has abstracted hardness ions from solution. Most TSI polymers have molecular weights in the range of 1,000–10,000, higher molecular weights being insoluble or not sufficiently soluble in the water to be effective.

In addition to the aforementioned characteristics, it is necessary that the ion exchange sites of the TSI material be spaced properly along the chain length so that the valence sites can be tied up by the hardness ions. The TSI compound must remain in suspension until it contacts a crystalline surface, at which time the Helmholtz double layer surrounding the polymer must contract to allow bonding to the crystalline surface. At the same time, the spacing of the ion exchange sites must match the spacing of the ions encountered in the crystalline structure, and perhaps most importantly, the TSI compound must bond with the crystalline surface at the nucleation sites in such a manner that the growth of additional scale is inhibited. Typically, this is accomplished by the production of a hydrophobic surface layer that prevents the deposition of any scale at the nucleation site and distorts any additional scale that does form so that it can be easily removed. Active sites on the crystals thereby become deactivated.

Using calcium carbonate as an example, crystals thereof which are found in water and on equipment surfaces have a relatively small number of nucleation sites for a comparatively large surface area, and a small quantity of the TSI material can deactivate them. The result is that any additional scale that does grow is widely spaced, porous, fragmented and prone to flaking off. Such scale has a relatively large surface area and can then easily be removed by acid cleaning. Absent the use of TSI compounds, the calcium carbonate scale is layered and dense with a relatively small surface area and is much more difficult to dissolve in acid cleaning solutions.

Prior researchers in the field have recognized for some time that a variety of scaling salts exist in water to be treated and that each salt has a different crystal spacing. If only a single scaling salt existed, it would be relatively easy to design a perfect TSI compound for the salt. It has also been suggested that by combining TSI polymers, an improvement may result. It has been hoped that such combinations will provide a synergistic result; i.e that a mixture of two compounds will provide better performance than a simple additive effect. While some synergistic mixtures have been reported, the majority of mixtures in fact produce results worse than the predicted additive effect. One theory used to explain the success of some mixtures is that a multi-dimensional polymer network is formed which is bonded together by the hardness ions. It has also been suggested that synergism for the same reason can result from the use of organophosphonates and a TSI polymer, especially those of the long chain type, such as maleic acid.

Several examples of prior attempts to provide effective TSI compounds or mixtures thereof will be discussed, reference being made to a number of United States patents. Perhaps the very large number of patents involved in the discussion will serve to point out the difficulty in obtaining truly effective and economic TSI products for a variety of uses, from bottle washing equipment to distillation equipment.

In U.S. Pat. No, 3,699,048 issued Oct. 17, 1972 to Krueger, et al., for "Process of Preventing Scale and Deposit Formation In Aqueous Systems and Product", the problem discussed relates to the removal of hardness causing ions in bottle cleaning solutions. The proposed mixture includes an amino alkylene phosphonic acid mixed with an acrylic or methacrylic acid polymer or copolymer, or a copolymer thereof with an ethylenically unsaturated compound, or a graft copolymer of a polysaccharide (e.g. starch), preferably in stoichiometric amounts calculated for the specific hardness system to be encountered. Synergism is claimed, and maleic acid is mentioned as one of the possible unsaturated acids for use in the graft copolymer embodiment.

A different proposal is set forth in U.S. Pat. No. 3,751,372 issued Aug. 7, 1973 to Zecher et al. for "Scale and Corrosion Control in Circulating Water Using Polyphosphates and Organophophonic Acids". The alleged synergistic mixture of the patent is a combination of a water soluble organophosphonic acid, preferably 1-hydroxy alkylene, 1-1-diphosphonic acid with either certain inorganic polyphosphates (or their corresponding acids) or polyfunctional acid phosphate esters of a polyhydric alcohol. The application mentioned in this patent is scale prevention in the circulating cooling water of evaporators.

In U.S. Pat. No. 3,481,869 issued Dec. 2, 1969 to Jones for "Inhibiting Scale", a heavy scale inhibitor is formed by combining a high-density, water solution of amino phosphonic acid and tetra-potassium pyrophosphate. The combination is discussed as being especially useful in preventing scale formation in wells, such as oil wells, even at very low temperatures.

A system for "Scale Inhibition and Removal in Steam Generation" is described is U.S. Pat. No. 3,549,538 issued Dec. 22, 1970 to Jacklin. Boiler feed water is treated with a mixture of two components, the first being a nitrilo compound and the second being a water soluble sulfoxy free polar addition polymer having a molecular weight of 1,000 or more. In the prior art section of this patent, Jacklin describes the attempted use of vinyl-addition polymers of maleic acid (as disclosed in Johnson U.S. Pat. No. 2,723,956), including the preferred styrene-maleic copolymer prepared by reaction of stoichiometric quantities of styrene and maleic anhydride.

In U.S. Pat. No. 3,451,939, issued June 24, 1969 to Palsion, et al., for "Threshold Compositions and Methods", the synergistic compositions include mixtures of polyphosphates and methylene phosphonates.

A further system for "Inhibiting Scale Deposition" is set forth in Ralston's U.S. Pat. No. 3,663,448 issued May 16, 1972. This system includes aminophosphonates mixed with water soluble polyacrylic acid derivatives.

In U.S. Pat. No. 3,505,238 issued Apr. 7, 1970 to Liddell for "Methods and Compositions for Inhibiting Scale in Saline Evaporators", the proposed treating agent is a salt of an amino-methylene phosphonate. A number of additives are suggested including anti-foam agents, water-soluble polymers, tannins, lignins and deareating materials, all designed to inhibit scale formation. The preferred water-soluble polymers are polyacrylamides.

In U.S. Pat. No. 3,682,224 issued Aug. 8, 1972 to Bleyle for "Scale Prevention Agents of Methacrylic Acid—Vinyl Sulfonate Copolymers for Saline Waters Evaporation", the aformentioned combination, with the sulfonate preferably being in a basic salt form, is used to allow the temperature of saline or seawater evaporators to be increased to temperatures as high as 280° F. without precipitation of calcium sulfate. The material is used in concentrations as low as 10 ppm.

Another "Scale Inhibiting Process" is disclosed in the Markofsky et al. U.S. Pat. No. 4,001,134 issued Jan. 4, 1977. Threshold quantities of copolymers of maleic anhydride and allylacetate are used to inhibit scale deposition in seawater distillation plants. This patent also describes the prior art use of maleic acid-styrene copolymers and other maleic anhydride copolymers, including ones capped with polyethylene glycols.

In U.S. Pat. No. 4,147,627 issued Apr. 3, 1979 to Goodman for "Process for Scale Control Using Mixtures of Polycationic and Polyanionic Polymers", the principal problem being addressed is prevention of magnesium hydroxide scale formation in evaporative desalination units. The polyanionic polymers include such materials as acrylic acid polymers, polyamides and polynitriles, while the polycationic materials are complex materials selected from four categories described at columns 3-4 of this patent. This patent is owned by American Cyanamid Company. The American Cyanamid Company also owns another patent related to magnesium hydroxide scale prevention, i.e. U.S. Pat. No. 4,166,041 issued to Goodman on Aug. 28, 1979 for "Process for Magnesium Scale Control Using Mixtures of Polycationic and Polyanionic Polymers". The polyanionic polymer used in this patent is derived from an ethylenically unsaturated dibasic acid (e.g. maleic) or an ethylenically unsaturated sulfonic acid. The polycationic material is selected from the four categories mentioned in the Goodman patent.

Another patent owned by American Cyanimid Company issued to Schiller et al., on Aug. 3, 1982, i.e., U.S. Pat. No. 3,342,652 for "Process for Scale Inhibition in Evaporative Desalination Units". In the patent a copolymer of maleic acid or anhydride and allyl sulfonic acid is used to prevent scale formation in evaporative desalination units.

Walinsky, in his U.S. Pat. No., 4,390,670, issued June 29, 1983 for "Acrylate/Maleate Copolymers, Their Preparation and Use as Antiscalants" describes a particular system for the preparation of the copolymer so that monomer and polymer species remain in solution. Use thereof at levels of 0.1 to 100 ppm is stated to prevent calcium and magnesium scale formation. The same inventor was issued U.S. Pat. No. 4,485,223 on Nov. 27, 1984 for "(Meth)acrylic Acid/Itaconic Acid Copolymers, Their Preparation and Use as Antiscalants." The patent describes a particular way of adding the monomers and inhibitors. Finally, U.S. Pat. No. 4,547,559 was issued to the same inventor on Oct. 15, 1985 for "Acrylate/Maleate Copolymers, Their Preparation and Use as Antiscalents." This patent is similar to the first mentioned Walinsky patent.

While the aforementioned patents describe a wide variety of antiscalants, scale formation in desalination units and other devices where the feed water contains scale forming ions is still a problem. While the various chemical systems mentioned above provide benefits which are significant when compared to untreated feed streams, the discovery of an antiscalant system which is substantially better than commercial products and the above suggested systems would represent an important advance in the art.

OBJECTS AND SUMMARY OF THE INVENTION

It is a primary object of the present invention to provide an antiscalant system which minimizes scale formation, especially of calcium carbonate, magnesium hydroxide and calcium sulfate scale, and which does so better than the systems presently commercially available or those which are described in the aforementioned patents.

Another object of the present invention is to provide an antiscalant system which can be used in a variety of devices which treat or utilize water which contains scale forming ions.

A further object of the present invention is to provide an antiscalant system which can substantially increase the time between cleaning of water treating equipment, such as desalination systems.

A still further object of the present invention is to provide an antiscalant system which is effective in reducing calcium carbonate, magnesium hydroxide and calcium sulfate scale formation in feed waters which contain varying quantities of the ions which lead to such scales.

How these and other objects of the invention are accomplished will be described in the following detailed description of the preferred embodiment. Generally, however, they are accomplished using an antiscaling system which includes three primary components: a maleic acid homopolymer, an organophosphonate and a sulfonated styrene-maleic acid copolymer. The preferred organophosphonate is 1-hydroxyethane-1, 1-diphosphonic acid (HEDPA). The three component sytems may be used in seawater desalination units, cooling towers, boilers, distillation devices, reverse osmosis units and the like. Further ways in which the objects are accomplished will become apparent to those skilled in the art after the description of the preferred embodiment has been read and understood. It will also be appreciated that the antiscalant system of the present invention is a threshold scale inhibitor system and may be used in small quantities, e.g. in the range of from 0.1 to 200 ppm or more.

DESCRIPTION OF THE DRAWINGS

There are no drawings in this chemical application.

DETAILED DESCRIPTION OF THE PREFERRED EMBODIMENT

As previously mentioned, synergism has been a goal of researchers working in the field of scale inhibition chemistry. I have found a synergistic mixture of compounds which acts as a threshold scale inhibitor and provides improved results over the other systems previously described and those presently available on the market. The mixture which I have invented includes a blend of two polymers and an organophosphonate, e.g. HEDPA. I believe that in my system, the synergism is provided by the polymers acting as backbones, with the HEDPA molecules polymerizing thereto, while the hardness ions act as links. The organophosphonate probably builds additional length to the branches created or bonds to other polymer chains. Such a mechanism would lead to the results I have obtained, in that a network or multi-dimensional mesh would be formed, which in turn would lay down on crystals as they begin to develop and deactivate larger crystal surfaces. The improvement then results from the recognition that such a network can deactivate larger scale forming surfaces than can the individual components of the mixture or any of the three possible sub-combinations of two of the three components.

In testing my improved antiscaling system, I employed different types of tests to determine effective ratios of the components of the mixture and to arrive at a formulation which would be as effective as possible in preventing the formation of all three of the commonly encountered scales, i.e., calcium sulfate, calcium carbonate and magnesium hydroxide.

In initial testing it was determined that mixtures of maleic acid polymers and an organophosphonate provided reasonably good results when employed with other polymers or an aminophosphonic acid as the third ingredient. However, when the water chemistry was shifted to provide a high supersaturation level for calcium sulfate, shorter run times were observed due to the formation of small crystals of calcium sulfate and a greatly increased supersaturation of scaling ions. In other words, the mixtures had good magnesium hydroxide and calcium carbonate scale prevention characteristics, but not as good scale prevention characteristics with respect to calcium sulfate.

Because excessive concentration factors can occur in evaporators, especially in areas of low water flow, such as in the U-bends of a heat exchange bundle, calcium sulfate precipitation can and frequently does occur along with calcium carbonate precipitation. Accordingly, ideal inhibitor systems should be able to minimize calcium sulfate precipitation but must first be effective in minimizing calcium carbonate and magnesium hydroxide scaling.

Generally improved results were noted when a maleic acid homopolymer and an organophosphonate were used in conjunction with a third polymeric material. However, greatly improved results were noted when the first two of these components were mixed with a sulfonated styrene-maleic acid copolymer as the third ingredient. In fact, run times in laboratory tests performed on this new mixture were so high that the concentration factor of calcium ions was increased three fold, to a total of five times the normal calcium level, to reduce the testing time period. Of course, such an increase also increases the supersaturation values for both calcium scaling salts but does not effect the magnesium hydroxide value. Relatively small changes in the compositions induced some increases or decreases in run time, as illustrated in the following Table 1.

During such testing, the formulation of Tests 1 and 2 from Table 1 ran 385 minutes before reaching a turbidity end point. This compared to a test using Wayplex HEDPA which reached only 85° C. before precipitation occurred, 39 minutes for component B when used alone, and 143 minutes when components A and B were used together in what was believed to be the maximum synergistic composition.

The results noted in the lab tests were confirmed in field tests conducted on an oil drilling ship in a spray film vapor compression seawater distillation unit. The seawater feed used in the field test had its concentration doubled in the blowdown with half of the water being produced as distilled water. A number of chemical and physical tests were performed during the field test, including distillate flow rate vs. time, lost alkalinity, cleanability and analysis of the scale formed on the tubes during testing.

Six different formulations which were mixtures developed in our laboratory, along with two individual scale inhibitors and one other commercial mixture were tested in the field. Each one was tested for two hundred hours and the slopes of the decline in production were compared. These test runs confirmed the laboratory tests that the mixtures of Tests 1 and 2 of Table 1 were substantially improved threshold scale inhibitors.

Full term testing was then performed using the composition of Tests 1 and 2 from Table 1, and an actual run time of 1200 hours was obtained. Lost methyl orange alkalinity was 22 mg/1 and the scale composition on the tubes was determined to be 6% calcium carbonate, 40% magnesium hydroxide and 38% calcium sulfate. This was about four times the running time using HEDPA alone and twice the run time obtained using our next best mixture. It also had twice the run time of the best commercial mixture.

The mixture of Tests 1 and 2 of Table 1 had higher lost alkalinities than some of our other blends which would normally indicate that the other blends would provide longer operating times between cleanings. The key factor in the substantial improvement in performance of this mixture was that the scale on the tubes formed like fine needles. The needles would grow relatively long as compared to their width and would break off. Thus the ability of this scale inhibitor mixture to allow only needle-like crystals to form, instead of the plate-like scale which normally grows, allows the scale to be self-cleaning as the water velocity breaks off crystals which then leave the system. This crystal modification of the scale by the TSI mixture is believed to be due to the presence of component C in the mixture.

Accordingly, the objects of the invention are optimally achieved by employing the compositions of Tests 1 and 2, with substantially improved results over those obtained using other commercially available scale inhib-

TABLE 1

THRESHOLD SCALE INHIBITOR LAB TESTS
BLEND A - FLASK TESTS

| TEST # | 1984 TEST DATE | PERCENT VOLUME | | | TOTAL % ACTIVE | WEIGHT PERCENT HEDPA | EVN | % ACTIVE TL-3 | ACTIVE 33% SOL | RUN TIME | % RUN TIME |
|---|---|---|---|---|---|---|---|---|---|---|---|
| | | HEDPA | EVN | TL-3 | | | | | | | |
| 1 | 6-25 | 56.7 | 26.7 | 16.7 | 49.47 | 68.7 | 17.8 | 13.5 | 16.49 | 385 | 100.00 |
| 2 | 7-30 | 56.7 | 26.7 | 16.7 | 49.47 | 68.7 | 17.8 | 13.5 | 16.49 | 99 | 100.00 |
| 3 | 7-30 | 53.3 | 30.0 | 16.7 | 48.57 | 65.9 | 20.4 | 13.7 | 16.19 | 69 | 69.70 |
| 4 | 7-30 | 53.3 | 23.3 | 23.3 | 49.03 | 65.3 | 15.7 | 19.0 | 16.34 | 79 | 79.80 |
| 5 | 7-31 | 60.0 | 23.3 | 16.7 | 50.37 | 71.5 | 15.3 | 13.2 | 16.79 | 75 | 75.76 |
| 6 | 7-31 | 60.0 | 30.0 | 10.0 | 49.90 | 72.1 | 19.8 | 8.0 | 16.63 | 92 | 92.93 | itors and our other blends of polymers and organophosphates.

While it is believed that the beneficial scale inhibition of the present invention can be accomplished using a number of available chemicals in these catgeories, I used products that were identified by certain trademarks as identified below.

For the HEDPA, both the Wayplex material identified above and Dequest 2010 were found to be effective, the latter being an HEPDA manufactured and sold by Monsanto Corporation.

For the maleic acid or anhydride homopolymer, a variety of Ciba-Geigy compounds were used, some in the acid and some in the sodium salt form. The acid polymers are sold under the trademarks Belgard EV, Belclene 200 and Belgard EV63, while the sodium salts are sold under the trademarks Belgard EVN, Belclene 201, Belgard EVN170 and Belros 285.The manufacture and composition of each of these Ciba-Geigy compounds has been fully disclosed in U.S. Pat. No. 3,810,834 granted to Jones et al on May 14, 1974. The patent discusses the uses of hydrolyzed polymaleic anhydride with a molecular weight in the range of 300 to 5,000. The molecular weight of Belclene 200 is identified in U.S. Pat. No. 4,446,045 granted to Snyder et al (column 6, lines 43–47) to be in a range of between 800 to 1,000.

The sulfonated styrene-maleic copolymers (Component C) which were found to be useful include the aforementioned Versa TL-3, as well as S-SMA 3000 polymer manufactured by Arco Chemical Co. Versa TL-3 has been disclosed in U.S. Pat. No. 4,446,045 granted to Snyder et al on May 1, 1984, as having a molecular weight of about 1,500 (see column 5, lines 49 and 50).

The aforementioned specific homopolymers, organophosphonates, and copolymers should not be taken as limiting, in that other commercially available products having properties similar to those of the tested compounds would be useful in the present invention.

The threshold scale inhibitor of the present invention can be prepared from mixtures of the three components which vary widely in percentage composition. For example, the maleic homopolymers can be used in amounts ranging from 1-50%, 20-30% being preferred. The HEDPA can be used from 30 to 90%, 50-60% being preferred. The copolymer can be used from 1 to 50%, 10-25% being preferred. The mixture itself can be used in amounts as small as 0.1 to 200 ppm or more and at temperatures between 0° C. to over 300° C., depending on the type of treatment apparatus involved, such as cooling towers, boilers, distillation apparatus, reverse osmosis apparatus, electrodialysis apparatus, heat exchangers and the like, i.e., devices where the formation and cleaning of scale has been a problem in the past. Neutralizers selected from the group of sodium, potassium, or other monovalent hydroxides may also be added to the scale inhibitor of the present invention.

While the foregoing description has referred to several embodiments, some of which are deemed to be optimum for "scale prevention in desalting devices, the invention is not to be limited by the foregoing description but is to be limited solely by the scope of the claims that follow.

I claim:

1. A threshold scale inhibitor comprising a mixture of about 10 to 25% by weight of a maleic acid or anhydride homopolymer, about 60 to 75% by weight of an organophosphonate, and about 5 to 25% by weight of a sulfonated styrene-maleic acid or anhydride copolymer.

2. The scale inhibitor of claim 1 wherein said homopolymer is a homopolymer selected from the group consisting of a maleic acid homopolymer in the acid form and a maleic acid homopolymer in the sodium salt form.

3. The scale inhibitor of claim 1 wherein said organophosphonate is 1-hydroxyethane-1, 1-diphosphonic acid.

4. The scale inhibitor of claim 2 wherein said organophosphonate is 1-hydroxyethane-1, 1-diphosphonic acid.

5. The scale inhibitor of claim 1 where said sulfonated styrene-maleic acid or anhydride copolymer is in the acid or salt form.

6. A threshold scale inhibitor comprising a mixture of from 15.3 to 20.4% by weight of a maleic acid or anhydride homopolymer, from 65.3 to 72.1% by weight of an organophosphonate, and from 8.0 to 19% by weight of a sulfonated styrene-maleic acid or anhydride copolymer.

7. The scale inhibitor of claim 6 wherein said mixture comprises 17.8% by weight of said homopolymer, 68.7% by weight of said organophosphonate and 13.5% by weight of said copolymer, said copolymer being in a 40% aqueous solution.

8. The scale inhibitor of claim 1 further including a neutralizer selected from the group consisting of sodium hydroxide, potassium hydroxide or other monovalent hydroxides.

* * * * *